United States Patent [19]

Tamura et al.

[11] Patent Number: 5,146,129
[45] Date of Patent: Sep. 8, 1992

[54] VIBRATION WAVE MOTOR

[75] Inventors: Masahisa Tamura; Ichiro Okumura, both of Yokohama, Japan

[73] Assignee: Canon Kabushiki Kaisha, Tokyo, Japan

[21] Appl. No.: 655,243

[22] Filed: Feb. 13, 1991

Related U.S. Application Data

[63] Continuation of Ser. No. 368,168, Jun. 16, 1989, abandoned, which is a continuation of Ser. No. 125,988, Nov. 27, 1987, abandoned.

[30] Foreign Application Priority Data

Dec. 1, 1986 [JP] Japan .................. 61-286242

[51] Int. Cl.$^5$ .................................................. H01L 41/08
[52] U.S. Cl. ............................................ 310/323; 310/328
[58] Field of Search ................................ 310/323, 328

[56] References Cited

U.S. PATENT DOCUMENTS

| | | | |
|---|---|---|---|
| 3,211,931 | 10/1965 | Tehon | 310/333 |
| 4,339,682 | 7/1982 | Toda et al. | 310/328 X |
| 4,399,386 | 8/1983 | Osaka et al. | 310/328 |
| 4,400,641 | 8/1983 | Vishnevsky et al. | 310/328 X |
| 4,613,782 | 9/1986 | Mori et al. | 310/323 |
| 4,705,980 | 11/1987 | Mishiro | 310/323 |
| 4,742,260 | 5/1988 | Shimizu et al. | 310/323 |
| 4,763,776 | 8/1988 | Okumura et al. | 198/630 |
| 4,893,045 | 1/1990 | Honda | 310/323 |

FOREIGN PATENT DOCUMENTS

| | | | |
|---|---|---|---|
| 0055867 | 4/1985 | Japan | 310/323 |
| 0129871 | 6/1988 | Japan | 310/323 |
| 0274378 | 11/1988 | Japan | 310/323 |
| 0144372 | 6/1989 | Japan | 310/323 |
| 0036776 | 2/1990 | Japan | 310/323 |
| 399036 | 3/1974 | U.S.S.R. | 310/328 |
| 0614477 | 7/1978 | U.S.S.R. | 310/328 |
| 0632014 | 11/1978 | U.S.S.R. | 310/328 |
| 0651434 | 3/1979 | U.S.S.R. | 310/328 |
| 0681479 | 8/1979 | U.S.S.R. | 310/328 |
| 0754527 | 8/1980 | U.S.S.R. | 310/323 |
| 0143682 | 9/1980 | U.S.S.R. | 310/328 |
| 0817816 | 4/1981 | U.S.S.R. | 310/323 |
| 0853711 | 8/1981 | U.S.S.R. | 310/323 |
| 0138469 | 10/1981 | U.S.S.R. | 310/328 |

*Primary Examiner*—Mark O. Budd
*Attorney, Agent, or Firm*—Fitzpatrick, Cella, Harper & Scinto

[57] ABSTRACT

A motor has at least a vibration rod parallel to the axis of a rotor, in which the vibration rod causes a rotary motion in the rotor. The motor is free from the annular stator showing a large attenuation of vibration and is not associated with the stator support. The motor is also provided with a higher efficiency of energy utilization in comparison with a conventional ultrasonic motor, and is free from the stopping or irregular rotation of the rotor. The vibration rod for rotating the rotor requires a smaller space in comparison with the annular stator in the conventional ultrasonic motor.

12 Claims, 5 Drawing Sheets

VIBRATION WAVE MOTOR

This application is a continuation of application Ser. No. 07/368,168, filed on Jun. 16, 1989, abandoned which is a continuation of application Ser. No. 07/125,988, filed on Nov. 27, 1987, both applications now abandoned.

BACKGROUND OF THE INVENTION

1. Field of the Invention

The present invention relates to a motor capable of generating mechanical power without relying on an electro-magnetic force, and more particularly to a compact and light-weight motor of such a type suitable for use in compact portable equipment such as camera.

2. Related Background Art

Among motors in the general sense, or devices for generating rotary power there are already known various principles of power generation, but motors in the narrow sense almost always refer to electric motors generating mechanical rotary power by an electromagnetic force, as they are most compact and most practical for use.

As recent technical developments in electric motors have enabled significant compactization, small motors are widely employed in cameras and other portable equipment, thus contributing to the improvement of the performance of such equipment.

However, compact motors employed in cameras or the like are capable of high-speed rotation but are incapable of generating a large torque at a low rotation speed. For this reason there is required a reduction mechanism, and the power generating mechanism including the motor and the reduction mechanism inevitably becomes considerably large. Therefore the development of a compact, light-weight motor capable of generating a large torque at a low rotation speed without the reduction mechanism has been needed.

In view of such background, recent trials in utilizing piezoelectric elements as a power source has led to the development of an ultrasonic motor in which an ultrasonic vibration generated by piezoelectric elements is converted into a rotary motion.

Such a known ultrasonic motor, for example, disclosed in U.S. Pat. Nos. 4,580,073 and 4,587,452, has a circular stator and a circular rotor, and a piezoelectric element adhered circularly to an end face of the circular stator which generates a circular elastic bending wave on the end face of the stator, thereby rotating the rotor maintained in contact with the end face of the stator.

Such a known ultrasonic motor, being capable of generating a large torque at a low rotation speed, can dispense with the reduction mechanism, and is therefore suitable for use in small equipment such as a camera, and is particularly suitable as an automatic focusing motor in a camera, because of its annular form. However in such a known ultrasonic motor, it has been difficult to support the stator in such a manner as to prevent attenuation of vibration. The support of the stator is particularly difficult in equipment susceptible to external shock, as in the case of a camera.

On the other hand, Japanese Patent Laid-open No. 55012/1986, corresponding to U.S. Pat. No. 4,763,776 proposes a technology of adhering electromechanical converting elements to plural rod-shaped elastically vibrating members, and causing a rotary motion in the elastically vibrating members by the vibrations generated in the converting elements, thereby transporting an article placed on the vibrating members.

Although the technology disclosed in the abovementioned reference is effective in causing a linear motion of the article along the surface of the vibrating members, it is not suitable for causing a rotary motion in an annular article such as a lens barrel.

SUMMARY OF THE INVENTION

An object of the present invention is to provide a motor of a novel structure, which is not associated with above mentioned drawbacks of the conventional ultrasonic motor, and which is free from attenuation of vibration, is free from difficulty in stator supporting, and is small and light in weight.

Another object of the present invention is to provide a compact vibration wave motor suitable for causing a rotary motion in an endless tubular article such as a lens barrel of a camera.

Still other objects of the present invention will become fully apparent from the following detailed description of the present invention.

The above-mentioned objects can be achieved, according to the present invention, by a motor having at least a vibration rod parallel to the axis of the rotor, in which the vibration rod causes a rotary motion in the rotor. The motor of the present invention, being free from the annular stator showing a large attenuation of vibration, is not associated with stator support, is provided with a higher efficiency of energy utilization in comparison with conventional ultrasonic motor, and is free from the stopping or irregular rotation of the rotor. Also the motor of the present invention can improve the space utilization in the equipment such as a camera, since the vibration rod for rotating the rotor requires a smaller space in comparison with the annular stator in a conventional ultrasonic motor.

DETAILED DESCRIPTION OF THE PREFERRED EMBODIMENTS

Now the present invention will be clarified in detail by embodiments thereof shown in the attached drawings.

Figure 1A:
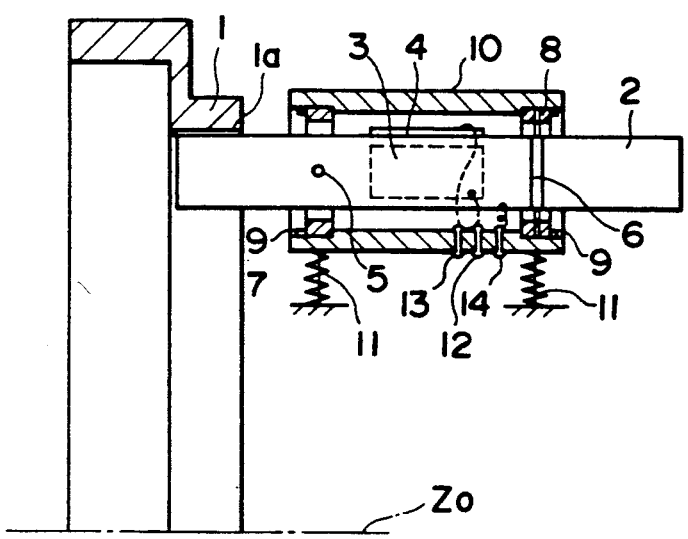
FIG. 1A is a partial cross-sectional view of a motor constituting a first embodiment of the present invention.
Figure 1B:
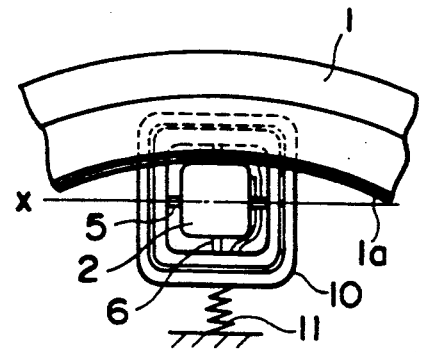
FIG. 1B is a lateral view of the first embodiment seen from the left side in FIG 1A.

FIG 1A is a partial longitudinal cross-sectional view of a vibration wave motor constituting a first embodiment of the present invention, and FIG 1B is a lateral view of the embodiment seen from the left side in FIG 1A.

Referring to these drawings, a rotor 1 is formed as an annular member with a shoulder, and is supported by an unrepresented member so as to be rotatable about an axis $Z_0$ of the rotor. On the internal periphery of the smaller diameter portion of the rotor 1, there is fixed a soft coating material 1a of a high friction coefficient, for example, by an adhesive material.

A vibration rod 2, for causing a rotary motion in the rotor 1, is placed parallel to the axis $Z_0$ of the rotor 1, and is so positioned that the front end of the vibration rod is inserted into the smaller diameter portion of the rotor 1 and the upper face of the front end portion is in the vicinity of the coating material 1a.

In the present embodiment, the vibration rod 2 is composed of a rectangular rod with a square cross section, so that the outer surface thereof is composed of a pair of horizontal faces and a pair of vertical faces. Piezoelectric elements 3, 4 are respectively mounted on a vertical face and a horizontal face of the vibration rod 2, in order to cause a vibration along a circular or oval trajectory in the end portion of vibration rod 2. Piezoelectric elements 3, 4, serving as electromechanical energy conversion elements, are mounted at the center in the longitudinal direction of the vibration rod 2, corresponding to the loop position of the vibration generated therein.

Fine holes are formed in the vibration rod 2, corresponding to the nodal positions thereof, and fine support rods are firmly fitted in said fine holes and protrude respectively from the vertical faces and the horizontal faces of the vibration rod 2. The support rods 5, 6 are composed of steel wires, and the ends of the support rod 5 are supported by a support ring 7 while those of the support rod 6 are supported by a support ring 8. The support rings 7, 8 have the same internal diameter and the same outer diameter, and are fitted in inner shouldered portions on both ends of a cylindrical support member 10 and maintained in place with fixing rings 9.

The support member 10 is resiliently supported by springs 11 on an unrepresented fixed member, and biased upwards by springs 11. Consequently the vibration rod 2 is also biased, by springs 11, toward the coating material 1a of the rotor 1.

Under support member 10 there are provided three terminals 12 14 for connection with a known control circuit to be explained later. The terminal 12 is connected to the piezoelectric element 3 through a lead wire, while the terminal 13 is connected to the piezoelectric element 4 through a lead wire, and the terminal 14 for grounding is connected to the vibration rod 2, which is therefore grounded through terminal 14, support member 10 and springs 11.

Now reference is made to FIG. 2 for explaining the vibration generated in the vibration rod 2, the principle of generating vibration, and the method of supporting vibration rod 2.

Figure 2A:
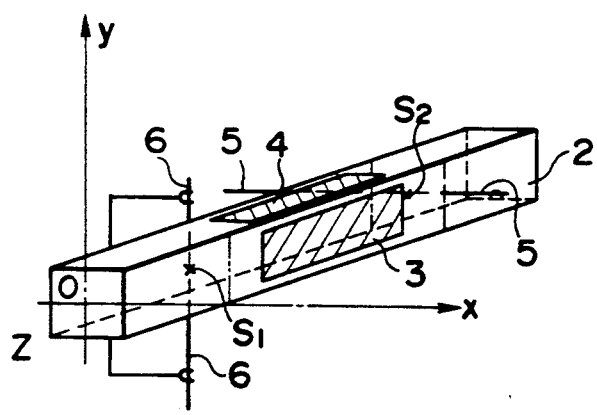
FIGS. 2A and 2B are schematic views showing a vibration rod and a support structure therefor, employed in the motor shown in FIGS. 1A and 1B.
Figure 2B:
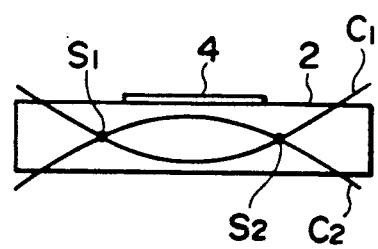

When the piezoelectric element 4 is mounted on the central portion of the horizontal face of the vibration rod 2 and is given a positive voltage, as shown in FIGS. 2A and 2B, piezoelectric element 4 applies a contracting force on the vibration rod along the central axis thereof, whereby the vibration rod exhibits an elastic deformation as represented by C1. On the other hand, when a negative voltage is given, the piezoelectric element 4 applies an extending force on the vibration rod 2 along the central axis thereof, whereby the vibration rod 2 exhibits an elastic deformation convex to the above, as shown by a curve C2. In this manner the vibration rod 2 generates a vibration in the vertical direction, by the elastic deformations C1 and C2, depending on the polarity of the voltage applied to the piezoelectric element 4, but, on the central line of the vibration rod 2 there exist nodal points S1, S2 of vibration which do not move even during such elastic deformation. Since the vibration energy is zero at these nodal points S1, S2, the vibration is not attenuated even if the vibration rod 2 is fixed or supported at points S1, S2. Consequently, in the motor of the present invention, the aforementioned support rods 5, 6 are fixed to the vibration rod 2 at points S1, S2.

An AC voltage applied to the piezoelectric element 3 similarly induces a horizontal vibration in the vibration rod 2. Consequently the vertical vibration caused by the piezoelectric element 4, combined with the horizontal vibration generated by the piezoelectric element 3, causes the end portion of the vibration rod 2 to vibrate along a circular trajectory, on the X—Y plane, about the axis Z of the rod 2. The trajectory of the vibration of the end portion of the vibration rod 2 can be modified from a circle to an oval by employing different voltage levels for supply to the piezoelectric elements 3, 4. It is also possible to change the direction of the oval by displacing the phases of the two vibrations, but, it is preferable to regulate the voltage and the phases of the voltages supplied to the piezoelectric elements 3, 4 in such a manner that the end portion of the vibration rod 2 follows a horizontally oblong oval trajectory the larger diameter of which is parallel to the z-axis.

Figure 2C:
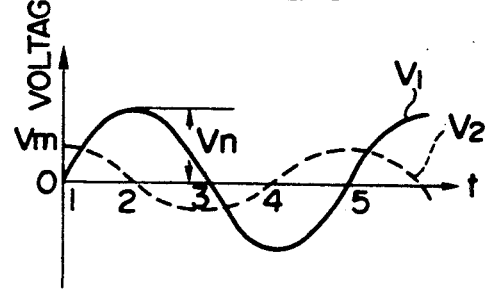
FIG. 2C is a wave form chart showing voltages supplied to two piezoelectric elements mounted on the vibration rod.
Figure 2D:
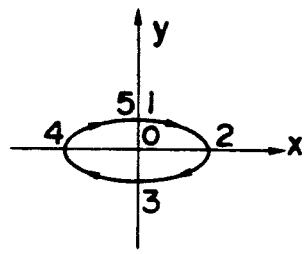
FIG. 2D is a chart showing the trajectory of vibration generated at the end of the vibration rod.

FIG. 2C shows an AC voltage V1 supplied to the piezoelectric element 3 and another AC voltage V2 supplied to the piezoelectric element 4, and FIG. 2D shows the oval vibration of the end portion of the vibration rod 2 when AC voltages V1, V2 are respectively supplied to the piezoelectric elements 3, 4. Because of the nature of the piezoelectric element, if the vibrating member is in a resonant state, the alternating deformation is delayed by 90° from the AC voltage. Thus the deformations at different moments (1) –(5) in FIG. 2D respectively correspond to the voltages V1, V2 at the moments 1-5 in FIG. 2C. More specifically, at a time 1 in FIG. 2C, the piezoelectric element 3 receives a voltage V1=0 while the piezoelectric element 4 receives a voltage V2=Vn, whereby the end portion of the vibration rod 2 a maximum displacement in a direction along the x-axis. At a time 2, where V2=0 and V1=Vn, the end portion of the vibration rod 2 shows a maximum displacement in the +Y-direction. Between the time 1 and time 2, the vibration rod 2 simultaneously receives the bending stresses in the x- and y-directions with mutually different magnitudes, so that the end of the vibration rod 2 moves along an oval trajectory as shown in FIG. 2D. In the course of movement 1-2-3 in FIG. 2D of the end of the vibration rod 2, the rod touches the coating material 1a on the internal periphery of the rotor 1 thereby giving a rotary force thereto, but it is separated from the coating material 1a of the rotor 1 in the positions 1 and 3, and in the trajectory 3-4-5.

Figure 3A:
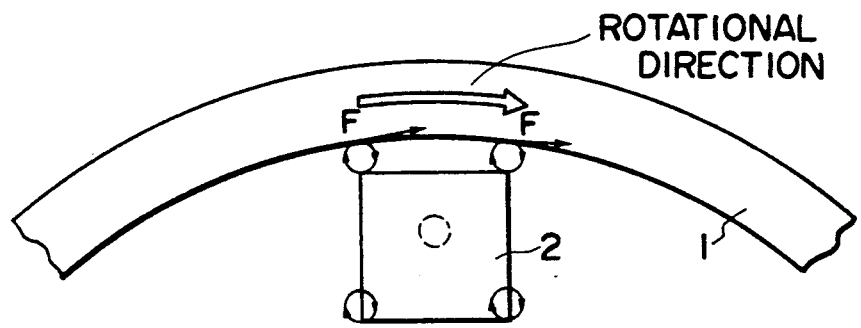
FIG. 3A is a view showing the relationship between the end of the vibration rod and the rotor in a second embodiment.

FIG. 3A shows the positional relationship of the vibration rod 2 and the rotor 1 and the movement of the vibration rod 2. Though FIG. 3A illustrates a state in which the vibration rod 2 is not in contact with the internal periphery of the rotor 1, each point of the vibration rod 2, when vibrated by the piezoelectric elements 3, 4, causes circular or oval motion as indicated by arrows therein, so that the vibration rod 2 touches the internal periphery of the rotor 1 in the upper half of circular or oval motion to rotate rotor 1 by the circumferential force F from the rod 2.

Figure 3B:
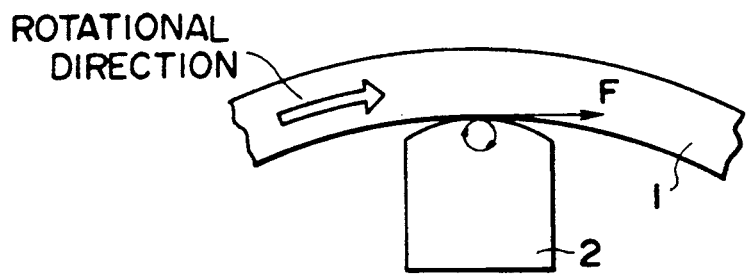
FIGS. 3B and 3C are views showing the relationship between the end of the vibration rod and the rotor in the second embodiment.
Figure 3C:
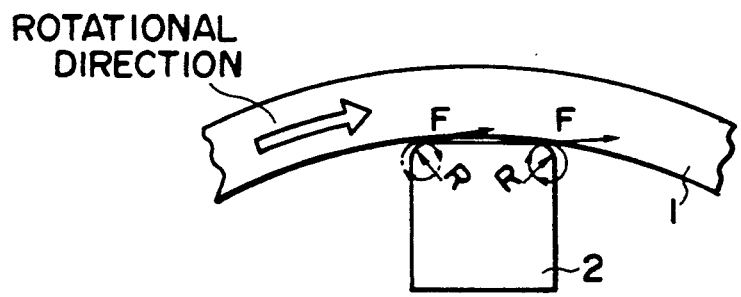
Figure 3D:
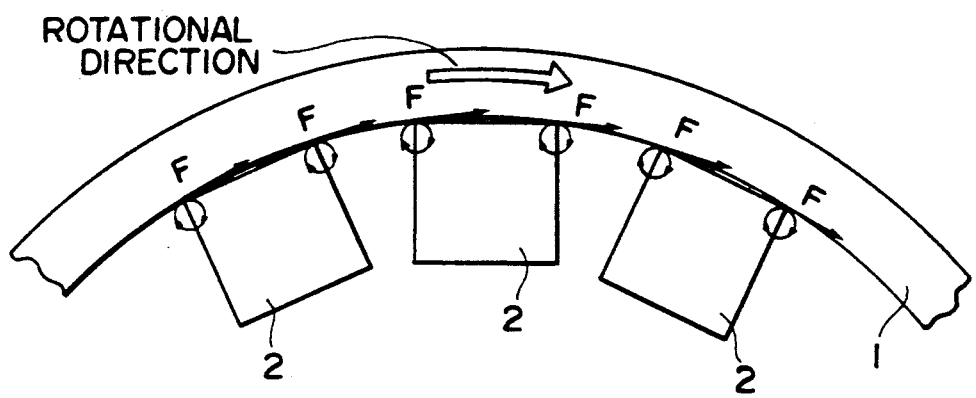
FIG. 3D is a partial schematic view of the motor of the embodiment having plural vibrating members.

The external face of the vibration rod 2 opposed to the internal periphery of the rotor 1 may be formed as a convex face instead of a flat face, as shown in FIG. 3B, in order to increase the contact area between the vibration rod 2 and the rotor 1. It is also possible, as shown in FIG. 3C, to form rounded portions on the corners coming into contact with the rotor. Furthermore there may be employed several vibration rods in parallel manner as shown in FIG. 3D, instead of a rod.

Figure 4:
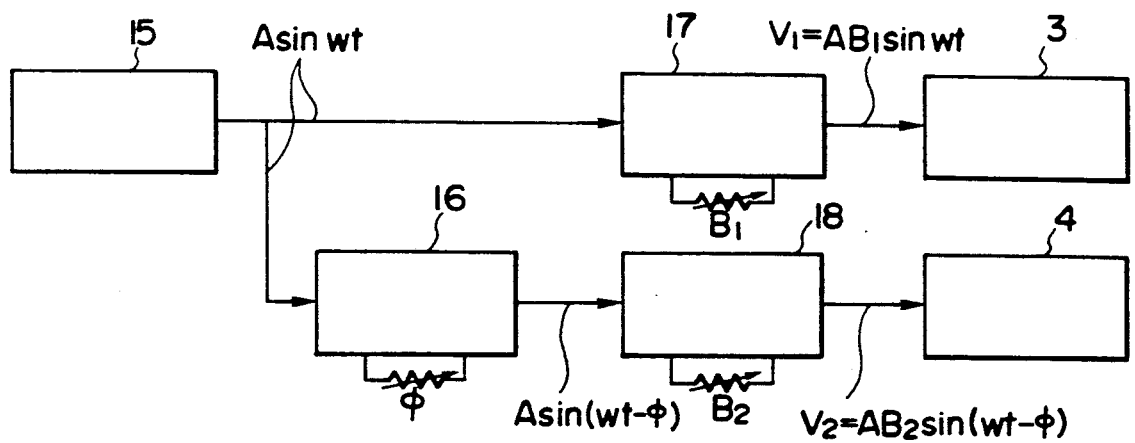
FIG. 4 is a block diagram of vibration exciting means for causing vibration in the vibration rod.

FIG. 4 is a block diagram of vibration exciting means including the piezoelectric elements 3, 4.

In FIG. 4 there are shown a known power supply circuit 15 for generating a sinusoidal voltage represented for example by A·sinω t; a known phase shifter 16 for shifting the phase of the output voltage A·sinω t from power supply circuit 15 by an arbitrary amount $\phi$; and known amplifiers 17, 18 respectively having degrees of amplification B1, B2. The piezoelectric element 3, being connected to the output terminal of said amplifier 17 through the aforementioned terminal 12, receives a voltage $V_1 = AB_1 \sin \omega t$. The piezoelectric element 4, being connected to the output terminal of the amplifier 18 through the aforementioned terminal 13, receives a voltage $V_2 = AB_2 \sin(\omega t - \phi)$. In this manner the piezoelectric elements 3, 4 receive voltages with a mutual phase difference $\phi$, so that the end of the vibration rod 2 causes a circular or oval vibration in the x-y plane, about the z-axis (longitudinal axis of the vibration rod 2). (In case of $B_1 = B_2$, a circular vibration is obtained at $\phi = 90 \times (2n-1)°$ (n=0, +1, ±2, ±3, ...) and an inclined oval vibration is obtained at $\phi \neq 90 \times (2n-1)°$).

In the foregoing explanation, the voltage supply means for the piezoelectric elements 3, 4 is composed of an analog circuit, but it may naturally be composed of a digital circuit. Also the voltages supplied to the piezoelectric elements need not be sinusoidal voltages but can be of voltages of various forms.

As explained in the foregoing, the motor of the present invention, being free from an annular stator as in the conventional ultrasonic motor, does not show attenuation of vibration, and can therefore provide high energy efficiency and stable rotation. Also the motor of the present invention is highly practical due to the absence of difficulty in the support of the annular state for avoiding the attenuation of vibration, and can be easily employed in various equipment.

Figure 5A:
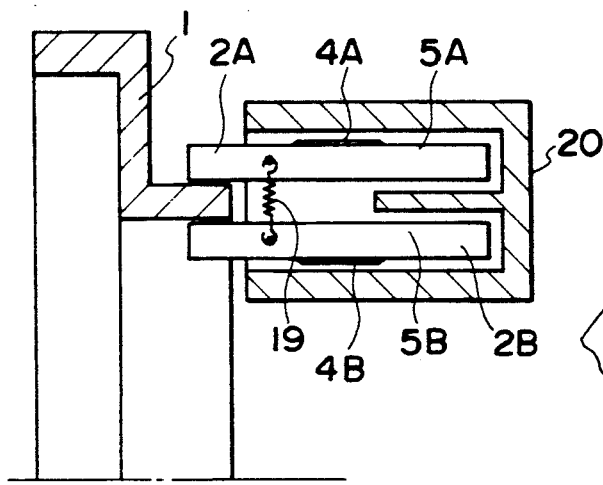
FIG. 5A is a partial cross-sectional view of a motor constituting a second embodiment of the present invention.
Figure 5B:
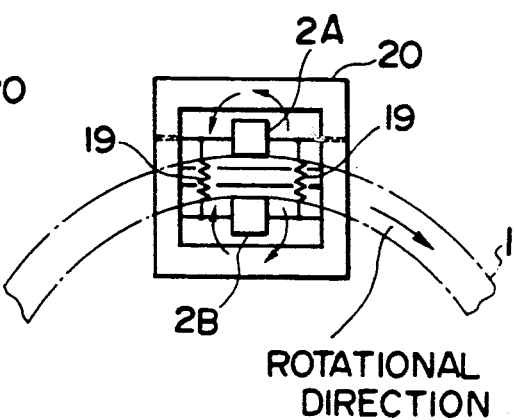
FIG. 5B is a partial elevation view of the embodiment seen from the left side in FIG. 5A.

FIGS. 5A and 5B show another embodiment in which vibration rods are provided inside and outside the rotor to pinch the rotor at the internal and external peripheries thereof by vibration rods, thereby providing a rotary motion to the rotor.

In FIGS. 5A and 5B, there are shown a first vibration rod 2A positioned close to the external periphery of a smaller diameter portion of a rotor 1; a second vibration rod 2B positioned close to the internal periphery of the smaller diameter portion of the rotor 1; a first piezoelectric element for causing vibration in the vertical direction, in the drawing, in the vibration rod 2A; a second piezoelectric element for causing vertical vibration in the vibration rod 2B; springs 19 for biasing the vibration rods 2A, 2B toward the external and internal peripheries of the smaller diameter portion of the rotor 1; and a support member 20 supporting the vibration rods 2A, 2B in essentially the same method as in the embodiment in FIG. 1. Each of the vibration rods is naturally provided with two piezoelectric elements respectively on the horizontal face and the vertical face in the same manner as shown in FIG. 1.

In the embodiment shown in FIGS. 5A and 5B, since a vibration rod 2A is also positioned also at the external periphery of the cylindrical portion of the rotor 1, the rotor can rotate smoothly without vibration in the radial direction, and there can be obtained a driving torque larger than that in the embodiment shown in FIG. 1.

In the embodiment shown in FIGS. 5A and 5B, the direction of vibration of the vibration rod 2A at the outside of the rotor 1 is opposite t that of the other vibration rod 2B. More specifically, as shown in FIG. 5B, the vibration rod 2A rotates counterclockwise while the rod 2B rotates clockwise.

Figure 6A:
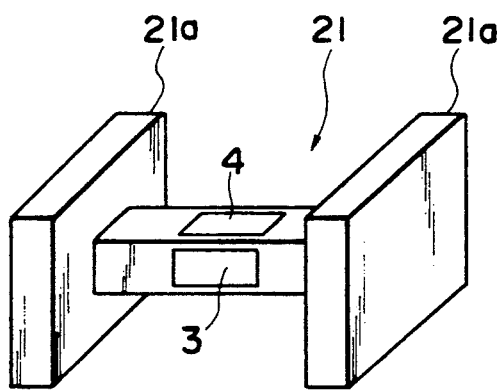
FIG. 6A is a perspective view showing a variation of the vibration rod shown in FIGS. 1A and 1B.

In the foregoing embodiments, the shape and structure of the vibration rod are not limited to those illustrated, but are subjected to various modifications. For example, for increasing the amplitude of vibration or obtaining a stronger vibration, it is necessary to increase the length or the mass of the vibration rod, but a larger length of the rod will inevitably increase the total length of the motor. Thus, in order to intensify the vibration without increasing the length of the vibration rod, there may be employed, as shown in FIG. 6A, a vibration rod 21 having portions of a larger mass 21a at the both of its ends.

Figure 6B:
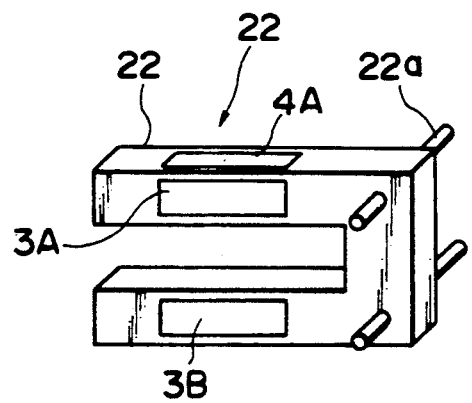
FIG. 6B is a perspective view showing a variation of the vibration rod shown in FIGS. 5A and 5B.

Also in the motor shown in FIGS. 5A and 5B, there may be employed a vibration rod 22 as shown in FIG. 6B, which combines two vibration rods 22A, 22B, for respectively engaging with the external and internal peripheries of the rotor, at an end thereof. In FIG. 6B, a support rod 22a, corresponding to the support rod 5 in FIG. 1, is positioned at a nodal position in the vibration generated in the vibration rod 22, in the same manner as in the embodiment shown in FIG. 1. In FIG. 6B, reference numerals 3A and 3B indicate piezoelectric elements.

Figure 7:
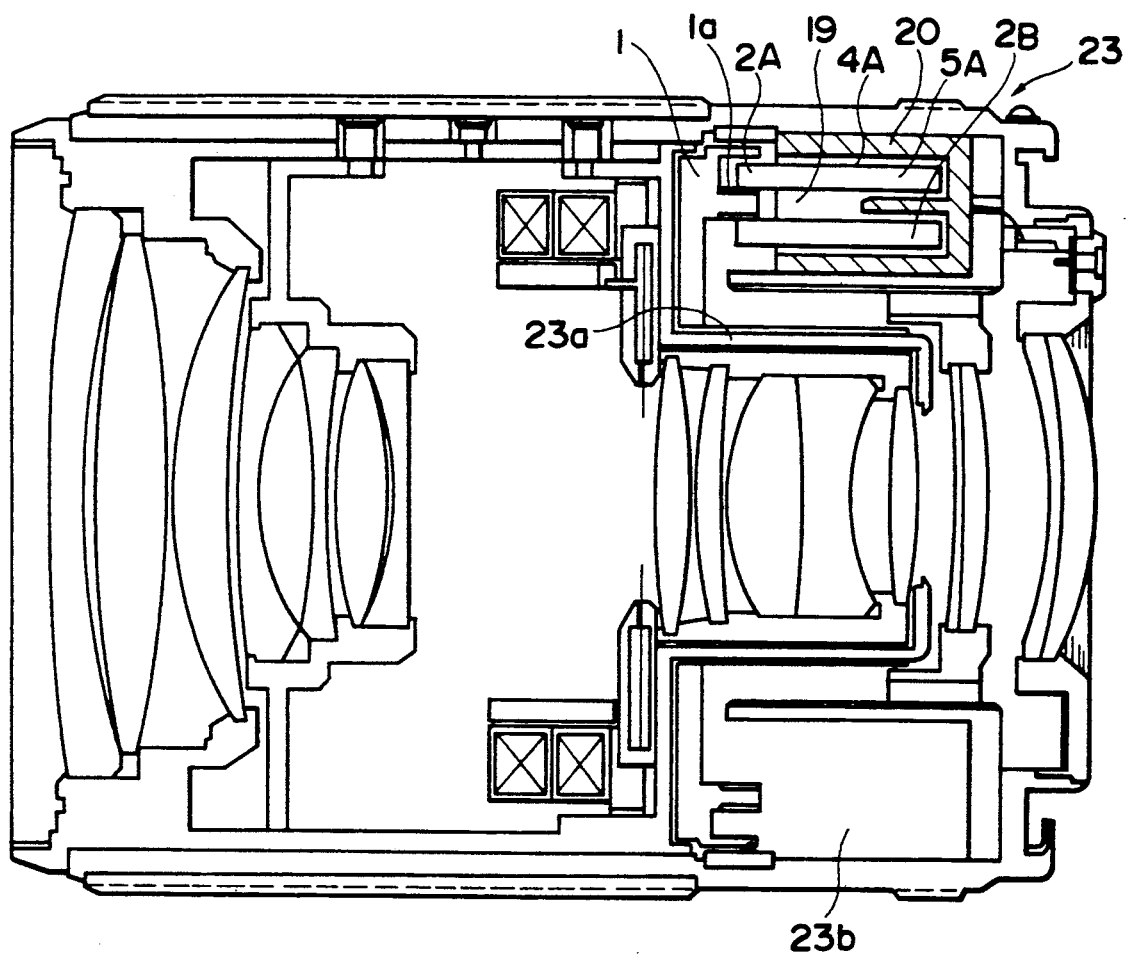
FIG. 7 is a longitudinal cross-sectional view of an interchangeable lens incorporating the motor of the embodiment shown in FIGS. 5A and 5B.

FIG. 7 is a schematic longitudinal cross-sectional view of an interchangeable lens 23 incorporating the motor of the present invention shown in FIGS. 5A and 5B.

As shown in FIG. 7, the motor of the present invention has the vibration rod assembly, for rotating the rotor 1, only in a limited portion of the periphery of the rotor 1, so that a large empty space 23b is formed outside the helicoid ring 23a when said motor is incorporated in the interchangeable lens. This empty space 23b can be utilized for housing an electronic device such as a control circuit, and the utilization of space in the lens body can be improved.

In the foregoing embodiments, piezoelectric elements are used for generating alternating bending stress in the vibration rod, but other means for generating alternating bending stress may also be employed for this purpose if such means is compact.

As explained in the foregoing, the motor of the present invention, lacking the annular stator as in the known ultrasonic motor, is free from attenuation of vibration and can therefore provide stable rotation and a high efficiency. Also it is suitable for practical use and can be employed in various equipment due to the absence of difficulty in the supporting method as in the case of an annular stator. Also in the application in an interchangeable lens for a camera, the motor can form a usable space in the lens, thereby enabling to improvement of the space utilization in the lens.

What is claimed is:

1. A vibration wave driven motor comprising:
   (a) a vibration member having a middle portion and end portions provided to sandwich said middle portion, at least one of said end portions serving as a driving element and each said end portion being greater in mass than said middle portion; and
   (b) an electromechanical energy conversion member functionally contacting said vibration member, said conversion member comprising a first electromechanical energy conversion element and a second electromechanical energy conversion element, said first electromechanical energy conversion element generating in said vibration member a bending vibration in a first direction in response to a first electrical signal applied and said second electromechanical energy conversion element generating in said vibration member a bending vibration in a second direction in response to a second electrical signal applied, said first electrical signal having an electrical phase different from said second electrical signal and said first direction being substantially perpendicular to said second direction,
   wherein vibration for moving a friction member contacting said vibration member is generated in said vibration member.

2. A vibration wave driven motor according to claim 1, wherein said end portions have a rectangular parallelepiped shape.

3. A vibration wave motor according to claim 1, wherein said first and second electromechanical conversion elements are provided on said middle portion.

4. A vibration wave driven motor according to claim 1, wherein said first and second electromechanical conversion elements are provided on said middle portion and each of said first and second elements is provided at a different position.

5. A vibration wave driven motor according to claim 1, wherein said first and second electromechanical conversion elements are provided on a surface of said middle portion.

6. A vibration wave driven motor comprising:
   (a) a vibration member having a middle portion and end portions provided to sandwich said middle portion, at least one of said end portions serving as a driving element and each said end portion having a cross section greater than that of said middle portion; and
   (b) an electromechanical energy conversion member functionally contacting said vibration member, said conversion member comprising a first electromechanical energy conversion element and a second electromechanical energy conversion element, said first electromechanical energy conversion element generating in said vibration member a bending vibration in a first direction in response to a first electrical signal applied and said second electromechanical energy conversion element generating in said vibration member a bending vibration in a second direction in response to a second electrical signal applied, said first electrical signal having an electrical phase different from said second electrical signal and said first direction being substantially perpendicular to said second direction;
   wherein vibration for moving a friction member contacting said vibration member is generated in said vibration member.

7. A vibration wave driven motor according to claim 6, wherein said end portions have a rectangular parallelepiped shape.

8. A vibration wave driven motor according to claim 6, wherein said first and second electromechanical conversion elements are provided on said middle portion.

9. A vibration wave driven motor according to claim 6, wherein said first and second electromechanical conversion elements are provided on said middle portion and each of said first and second elements is provided at a different position.

10. A vibration wave driven motor according to claim 6, wherein said first and second electromechanical conversion elements are provided on a surface of said middle portion.

11. A vibration wave driven motor comprising:
    (a) a vibration member having a middle portion and end portions provided to sandwich said middle portion, at least one of said end portions serving as a driving element and each said end portions being greater in mass than said middle portion;
    (b) an electromechanical energy conversion member functionally contacting said vibration member, said conversion member comprising a first electromechanical energy conversion element and a second electromechanical energy conversion element, said first electromechanical energy conversion element generating in said vibration member a bending vibration in a first direction in response to a first electrical signal applied and said second electromechanical energy conversion element generating in said vibration member a bending vibration in a second direction in response to a second electrical signal applied, said first electrical signal having an electrical phase different from said second electrical signal and said first direction being substantially perpendicular to said second direction, thereby generating the vibration in said vibration member; and
    (c) a movable member engaged with said vibration member and moved by the vibration generated in said vibration member.

12. A vibration wave driven motor for a camera, said motor comprising:
    (a) a vibration member having a middle portion and end portions provided to sandwich said middle portion, at least one of said end portions serving as a driving element and each said end portion being greater in mass than said middle portion;
    (b) an electromechanical energy conversion member functionally contacting said vibration member, said conversion member comprising a first electromechanical energy conversion element and a second electromechanical energy conversion element, said first electromechanical energy conversion element generating in said vibration member a bending vibration in a first direction in response to a first electrical signal applied and said second electromechanical energy conversion element generating in said vibration member a bending vibration in a second direction in response to a second electrical signal applied, said first electrical having an electrical phase different from said second electrical signal and said first direction being substantially perpendicular to said second direction, thereby generating the vibration in said vibration member; and (c) a movable member engaged with said vibration member and moved by the vibration generated in said vibration member.

* * * * *

UNITED STATES PATENT AND TRADEMARK OFFICE
CERTIFICATE OF CORRECTION

PATENT NO. : 5,146,129

DATED : September 8, 1992

INVENTOR(S) : Tamura et al.

It is certified that error appears in the above-identified patent and that said Letters Patent is hereby corrected as shown below:

Title page, item
[56] References Cited

Foreign Patent Documents

"0143682 9/1980 U.S.S.R." should read
--0143682 9/1980 Dem. Rep. of Germany--.

"0138469 10/1981 U.S.S.R." should read
--0138469 10/1981 Japan--.

COLUMN 1

Line 5, "abandoned" should be deleted.

Line 16, "camera." should read --a camera.--.

COLUMN 3

Line 61, "12 14" should read --12-14--.

COLUMN 5

Line 48, "(In case" should read --(In a case--.

UNITED STATES PATENT AND TRADEMARK OFFICE
CERTIFICATE OF CORRECTION

PATENT NO. : 5,146,129

DATED : September 8, 1992

INVENTOR(S) : Tamura et al.

It is certified that error appears in the above-identified patent and that said Letters Patent is hereby corrected as shown below:

COLUMN 6

Line 22, "also" (second occurrence) should be deleted.

Line 30, "t" should read --to--.

Line 45, "the" should be deleted.

COLUMN 7

Line 17, "to" should read --an--.

COLUMN 10

Line 1, "first electrical" should read --first electrical signal--.

Signed and Sealed this

Nineteenth Day of October, 1993

Attest:

BRUCE LEHMAN

*Attesting Officer*     *Commissioner of Patents and Trademarks*